United States Patent [19]

Maruhashi et al.

[11] Patent Number: 4,699,809

[45] Date of Patent: Oct. 13, 1987

[54] PROCESS FOR PREPARATION OF COATED ORIENTED PLASTIC CONTAINER

[75] Inventors: Yoshitsugu Maruhashi, Yokohama; Isao Tanikawa, Ayase; Sadao Hirata, Kamakura, all of Japan

[73] Assignee: Toyo Seikan Kaisha, Ltd., Tokyo, Japan

[21] Appl. No.: 818,904

[22] Filed: Jan. 15, 1986

Related U.S. Application Data

[63] Continuation of Ser. No. 438,760, Nov. 3, 1982, abandoned.

[30] Foreign Application Priority Data

Nov. 5, 1981 [JP] Japan .................................. 56-176369

[51] Int. Cl.$^4$ ................................................ B05D 7/22
[52] U.S. Cl. .................................... 427/230; 264/129; 264/134; 264/209.3; 264/210.1; 264/210.4; 264/234; 264/235; 264/235.8; 264/320; 264/322; 264/544; 427/171; 427/374.1; 427/379; 427/373.5
[58] Field of Search ............ 427/160, 230, 379, 393.5, 427/171, 374.1; 264/129, 234, 235, 235.8, 210.1, 210.4, 209.3, 544, 320, 322, 134

[56] References Cited

U.S. PATENT DOCUMENTS

| | | | |
|---|---|---|---|
| 2,897,100 | 7/1959 | Grenley et al. | 428/518 |
| 2,985,542 | 5/1961 | Pinsky et al. | 428/35 |
| 3,134,684 | 5/1964 | Northrop et al. | 427/54.1 |
| 3,313,757 | 4/1967 | Trofimow et al. | 524/820 |
| 3,322,614 | 5/1967 | Seiferth et al. | 428/510 |
| 3,328,196 | 6/1967 | Sincock | 428/35 |
| 3,353,991 | 11/1967 | Shelburg et al. | 428/518 |
| 3,353,992 | 11/1967 | Grenley et al. | 428/216 |
| 3,380,844 | 4/1968 | Menikheim et al. | 428/516 |
| 3,438,788 | 4/1969 | Gifford et al. | 426/398 |
| 3,449,479 | 6/1969 | Cines | 264/513 |
| 3,468,703 | 9/1969 | Gibbs et al. | 428/327 |
| 3,468,994 | 9/1969 | Gilbert | 264/516 |
| 3,557,041 | 1/1971 | Loshaek et al. | 524/560 |
| 3,589,506 | 6/1971 | Ford et al. | 206/0.6 |
| 3,661,677 | 5/1972 | Wang | 156/315 |
| 3,723,168 | 3/1973 | Utz et al. | 227/171 |
| 3,746,196 | 7/1973 | Sako et al. | 215/1 C |
| 3,804,663 | 4/1974 | Clark | 427/45.1 |
| 3,850,671 | 11/1974 | Petty et al. | 427/366 |
| 3,922,451 | 11/1975 | Anschutz et al. | 427/230 X |
| 4,041,235 | 8/1977 | Suzuki et al. | 428/413 |
| 4,127,633 | 11/1978 | Addleman | 264/134 |
| 4,254,170 | 3/1981 | Roullet et al. | 428/36 |

FOREIGN PATENT DOCUMENTS

2404512 6/1975 Fed. Rep. of Germany .
2014160 4/1979 United Kingdom .

*Primary Examiner*—Bernard D. Pianalto
*Attorney, Agent, or Firm*—Sherman and Shalloway

[57] ABSTRACT

Disclosed is a process for the preparation of a coated oriented plastic container, which comprises coating an aqueous latex or organic solvent solution of a vinylidene chloride copolymer on at least one surface of a parison, preform or sheet for formation of container which is formed by hot molding of a molecularly orientable thermoplastic resin, drying the coated parison, preform or sheet to form a coating layer, and subjecting the formed coated structure to draw molding such as biaxial draw blow molding or draw forming, wherein the coating layer of the vinylidene chloride copolymer is crystallized at the step of forming the coating layer or the draw molding step.

In the coated oriented plastic container prepared according to this process, the adhesion of the coating layer of the vinylidene chloride copolymer to the plastic container substrate is highly improved, and even under severe conditions, peeling of the coating layer is prevented. Moreover, the gas barrier property, strength and chemical resistance of the container are prominently improved.

39 Claims, 2 Drawing Figures

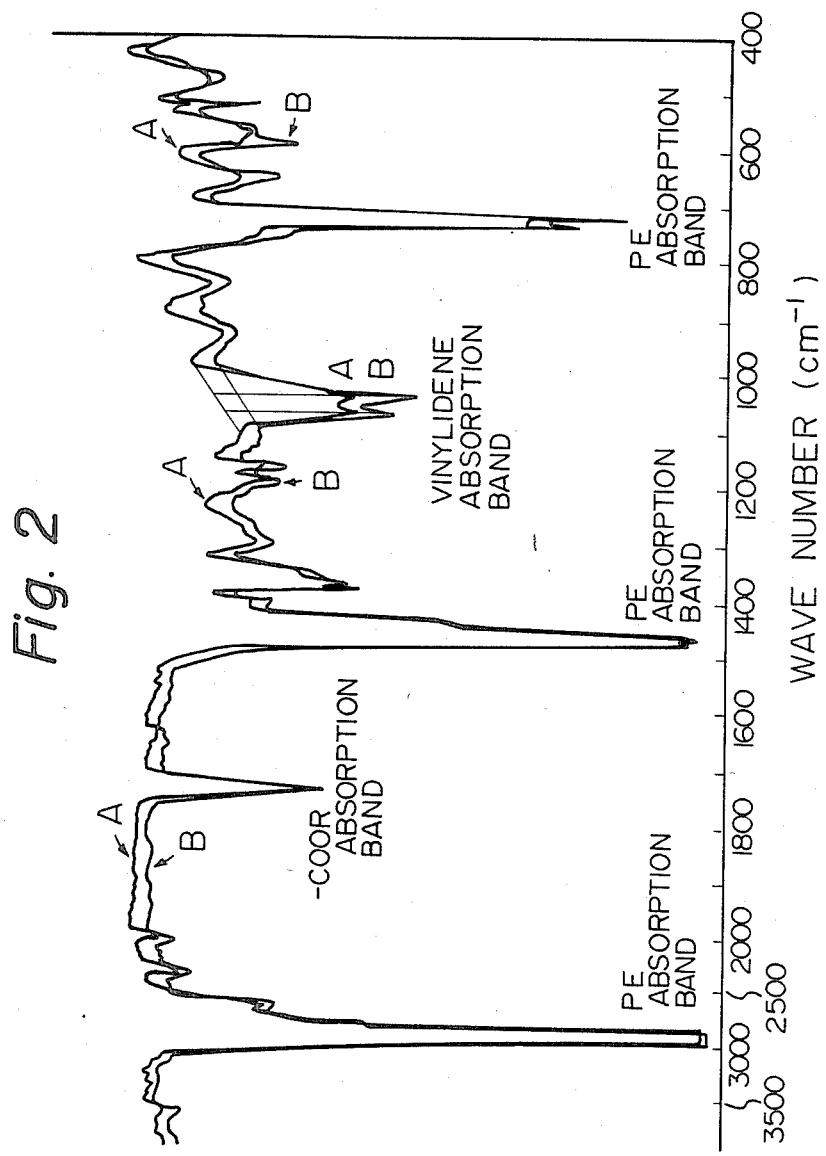

PROCESS FOR PREPARATION OF COATED ORIENTED PLASTIC CONTAINER

This application is a continuation of application Ser. No. 438,760, filed Nov. 3, 1982, abandoned.

BACKGROUND OF THE INVENTION (1) Field of the Invention

The present invention relates to a process for the preparation of a coated oriented plastic container. More particularly, the present invention relates to a process for the preparation of a coated oriented plastic container in which the adhesion, gas barrier property, strength and chemical resistance can be improved by crystallizing a coating layer of a vinylidene chloride copolymer formed on a plastic container substrate.

(2) Description of the Prior Art

Plastic bottles prepared by melt-extruding and hollow-molding (blow-molding) thermoplastic plastics such as polyolefins are used in various fields instead of glass bottles because the plastic bottles have a lighter weight and a better shock resistance than the glass bottles.

General-purpose plastics such as polyolefins are excellent in the moisture resistance and sanitary characteristics, but the oxygen permeability coefficient is relatively high and in bottles of these plastics, permeation of oxygen through bottle walls is not negligible. Accordingly, bottles of general-purpose plastics are not suitable as vessels for preserving foods for a long time or as vessels for cosmetics and the like where a high flavor-retaining property is required.

As a means to overcome this defect, there have been developed and proposed plastic containers having a wall structure excellent in the oxygen barrier property. Among melt-extrudable thermoplastic resins which are now available, a saponified ethylene/vinyl acetate copolymer (ethylene/vinyl alcohol copolymer) is most excellent in the oxygen barrier property. However, this saponified copolymer is inferior in the moisture resistance, that is, the steam barrier property, and in this saponified copolymer, the oxygen permeability coefficient tends to increase as increase of the humidity. Accordingly, when this saponified copolymer is actually used for formation of plastic container, it is necessary to adopt a troublesome molding method in which this saponified copolymer is sandwiched by moisture-resistant resins such as polyolefins and the resulting laminate is fed to the molding step to form a multi-layer laminate container.

SUMMARY OF THE INVENTION

To our surprise, it was found that when a vinylidene chloride copolymer is coated in the form of an aqueous latex or organic solvent solution on the surface of a parison preform or sheet for a plastic container formed by hot molding and this coating layer is crystallized, the adhesion of the coating layer to the plastic container substrate is highly improved.

It is therefore a primary object of the present invention to provide a process for the preparation of a coated oriented plastic container in which the adhesion of a coating layer of a vinylidene chloride copolymer to a molecularly oriented plastic container substrate is highly improved.

Another object of the present invention is to provide a process for the preparation of a coated oriented plastic container in which peeling of a coating layer is prevented even under such severe conditions that the content in the container is frozen or when the container undergoes such an extreme deformation as will crush the bottle at low temperatures.

Still another object of the present invention is to provide a process for the preparation of a coated oriented plastic container in which not only the adhesion of a coating layer of a vinylidene chloride copolymer but also the gas barrier property, strength and chemical resistance are highly improved.

More specifically, in accordance with the present invention, there is provided a process for the preparation of a coated oriented plastic container, which comprises coating an aqueous latex or organic solvent solution of a vinylidene chloride copolymer on at least one surface of a parison, preform or sheet for formation of container, which is formed by hot molding of a molecularly orientable thermoplastic resin, drying the coated parison, preform or sheet to form a coating layer, and subjecting the formed coated structure to draw molding such as biaxial draw blow molding or draw forming, wherein the coating layer of the vinylidene chloride copolymer is crystallized at the step of forming the coating layer or the draw molding step.

BRIEF DESCRIPTION OF THE DRAWINGS

FIG. 2 shows an infrared absorption spectrum of a coated film formed by coating a vinylidene chloride resin on a polyethylene film.

DETAILED DESCRIPTION OF THE PREFERRED EMBODIMENTS

Figure 1:
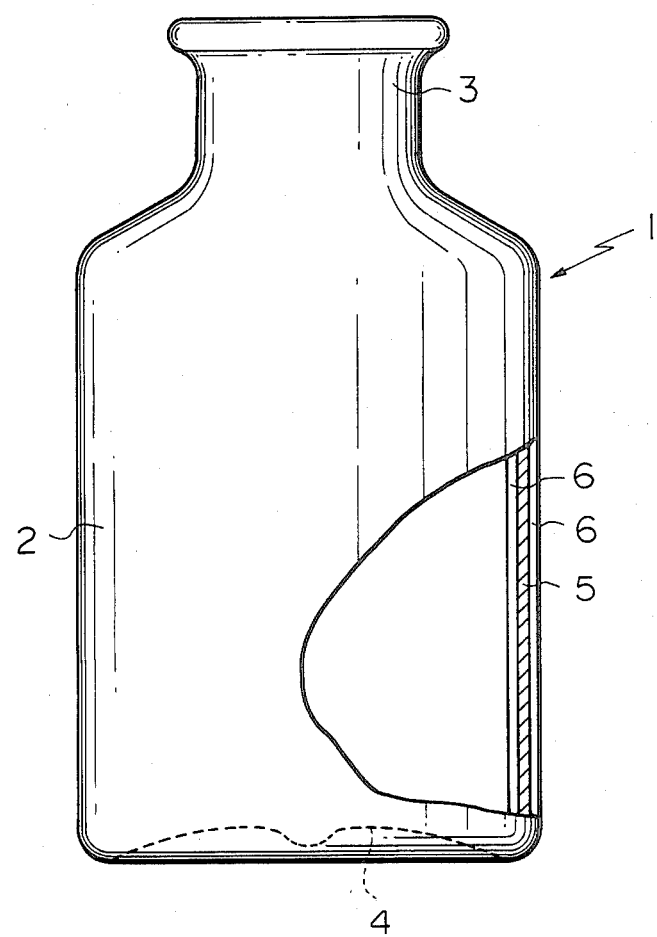
FIG. 1 is a partially sectional side view illustrating one embodiment of the plastic bottle according to the present invention.

Referring to FIG. 1 illustrating an embodiment of the coated plastic bottle of the present invention, this bottle 1 comprises a peripheral wall 2 having a circular or ellipsoidal section, a mouth portion 3 connected integrally to the peripheral wall 2 and a bottom portion 4 connected to the lower end of the peripheral wall 2. All of these bottle walls comprise a plastic bottle substrate 5 formed from a melt-moldable thermoplastic resin by biaxially drawing blow molding or draw forming, and a coating layer 6 of a vinylidene chloride copolymer formed on the surface of the substrate 5. The coating layer 6 may be formed on both the surfaces of the bottle substrate 5 as shown in FIG. 1 or it may be formed only on the inner or outer surface of the bottle substrate 5.

It is known that a vinylidene chloride copolymer is a resin excellent in the oxygen barrier property. However, hot molding of this vinylidene chloride copolymer is difficult, and the copolymer should be handled in the form of an aqueous latex or organic solvent solution.

The critical feature of the present invention resides in the finding that, as pointed out hereinbefore, when a vinylidene chloride copolymer is coated in the form of an aqueous latex or organic solvent solution on the surface of a plastic parison, preform or sheet formed by hot molding in advance and the coated structure is subjected to draw molding to form a composite plastic container, if the coating layer of the vinylidene chloride copolymer is crystallized at the step of forming the coating layer or the draw molding step, the adhesion of the coating layer to the plastic substrate is highly improved.

In a coated plastic container formed by ordinarily coating a vinylidene chloride copolymer and drying the coating layer, the adhesion of the coating layer to the substrate seems good. However, when this coated container is placed under such severe temperature conditions that the content liquid is frozen or when it is crushed at low temperatures, the coating layer of the vinylidene chloride copolymer is readily peeled from the container substrate. This phenomenon is similarly observed when a parison or the like provided with a coating layer of a vinylidene chloride copolymer is subjected to draw molding.

In the present invention, by positively crystallizing the vinylidene chloride copolymer constituting the coating layer formed on a parison, preform or sheet to be subjected to draw molding at the step of forming the coating layer or at the draw molding step, the adhesion of the coating layer to the plastic bottle substrate is improved to such an extent that under the above-mentioned severe conditions, peeling is not substantially caused. This finding is quite unexpected from the common sense in the art of coating. More specifically, it has been considered that when a crystallizable thermoplastic resin is used as a coating layer, from the viewpoint of the adhesion of the coating layer, it is important that the resin should not be crystallized. Accordingly, in the conventional methods, there have been adopted rapid cooling means for passing the coating layer rapidly through the crystallization temperature range. In contrast, in the present invention, a parison or the like to be subjected to draw molding is coated with a vinylidene chloride copolymer and the coating layer is crystallized by a heat treatment at the coating-forming step or draw molding step, whereby the adhesion of the coating layer to a molecularly oriented plastic container formed by draw molding is prominently improved with this crystallization. This fact will become apparent from examples given hereinafter.

In order to attain the objects of the present invention, it is preferred that the coating layer of the vinylidene chloride copolymer be crystallized so that the degree of crystallization of the coating layer of the vinylidene chloride copolymer is at least 0.5, especially at least 0.8, as determined according to the infrared absorption spectrum method described hereinafter.

According to the present invention, by crystallizing the vinylidene chloride copolymer constituting the coating layer, the barrier properties to gases such as oxygen, carbon dioxide gas and steam can prominently be improved, and mechanical properties such as the tensile strength, impact resistance and abrasion resistance, the chemical resistance such as the alkali resistance and the hot water resistance such as the resistance to whitening by hot water can also be improved prominently. Therefore, a coated container excellent in various properties can be obtained according to the present invention.

The parison, preform or sheet that is used in the present invention can be obtained from a molecularly orientable, hot-moldable thermoplastic resin by optional known hot molding means. For example, a parison for biaxial draw blow molding can be obtained by extruding the above-mentioned resin in the form of a pipe and cutting the pipe. Furthermore, a bottomed parison for biaxial draw blow molding can be obtained by extruding the resin in the cylindrical form, pinching off the extrudate by a split mold and subjecting the extrudate to preliminary blow molding. Moreover, a bottomed parison for biaxial draw blow molding can be obtained by injection-molding the above-mentioned resin. Still further, a sheet for draw forming of a wide-mouth container can be obtained by extruding the resin in the form of a sheet through a T-die or the like.

As preferred examples of the resin used for formation of the parison, there can be mentioned olefin resins such as isotactic polypropylene, crystalline propylene/ethylene copolymers, crystalline propylene/butane-1 copolymers, crystalline propylene/butene-1/ethylene copolymers and ethylene/vinyl alcohol copolymers, polyesters such as polyethylene terephthalate, polybutylene terephthalate and polyethylene terephthalate/isophthalate, polyamides such as nylon 6, nylon 6,6 and nylon 6,10, polystyrene, styrene type copolymers such as styrene/butadiene block copolymers, styrene/acrylonitrile copolymers, styrene/butadiene/acrylonitrile copolymers (ABS resins), polyvinyl chloride, vinyl chloride type copolymers such as vinyl chloride/vinyl acetate copolymers, polymethyl methacrylate and acrylic copolymers such as methyl methacrylate/ethyl acrylate copolymers, and polycarbonate, though usable resins are not limited to those exemplified above. These thermoplastic resins may be used singly or in the form of a blend of two or more of them. The plastic parison or the like may have a single layer structure or a multi-layer laminate structure formed, for example, by simultaneous melt extrusion.

An aqueous latex or organic solvent solution of a vinylidene chloride copolymer is coated on at least one surface of the above-mentioned plastic parison or the like.

As the vinylidene chloride copolymer, there is used a copolymer comprising vinylidene chloride as the main constituent monomer and at least one comonomer selected from an acrylic or methacrylic monomer, a vinyl aromatic monomer such as styrene or vinyl toluene, a vinyl ester such as vinyl acetate or vinyl propionate, a diolefin such as butadiene or isoprene, and methyl vinyl ether, glycidyl allyl ether, vinyl chloride, trichloroethylene, tetrachloroethylene, vinyl fluoride, vinylidene fluoride, trifluoroethylene, tetrafluoroethylene, maleic anhydride, fumaric acid, vinyl succinimide and vinylpyrrolidone. As suitable examples of the acrylic or methacrylic monomer, there can be mentioned acrylic acid, acrylonitrile, acrylamide, methyl acrylate, ethyl acrylate, methyl α-chloroacrylate, propyl acrylate, butyl acrylate, hexyl acrylate, octyl acrylate, cyclohexyl acrylate, glycidyl acrylate, 2-hydroxyethyl acrylate, acrylic acid monoglyceride, phenyl acrylate, methacrylic acid, methacrylonitrile, methacrylamide, methyl methacrylate, amyl methacrylate, glycidyl methacrylate, methacrylic acid monoglyceride, 2-hydroxypropyl methacrylate, β-methoxyethyl methacrylate, β-aminoethyl methacrylate and γ-N,N-diethylaminopropyl methacrylate.

An aqueous latex of the vinylidene chloride copolymer having a solid concentration of 20 to 65% and a viscosity of 3 to 500 centipoises is preferably used in the present invention.

A solution having a solid content of 5 to 60% in an organic solvent such as toluene, tetrahydrofuran, ethyl acetate, methylethyl ketone, cyclohexane, dimethylformamide, dimethylsulfoxide or dioxane is used as the organic solvent solution.

Coating of the plastic container subtrate with the above-mentioned copolymer latex or solution may be accomplished by adopting at least one of known coating methods such as dip coating, spray coating, brush coating, roller coating, electrostatic coating, centrifugal coating, cast coating and electrophoretic coating methods. The coating operation may be conducted only once or a multiple stage coating method may be adopted. If desired, the plastic container substrate such as a parison may be subjected to a wetting property-improving preliminary treatment such as a pretreatment with an anchoring agent, a corona discharge treatment, a surface active agent coating treatment or a chemical etching treatment. Furthermore, in order to impart an electric conductivity, the plastic container substrate may be subjected to a conducting treatment.

In the present invention, it is preferred that the coating layer of the above-mentioned copolymer be formed on both the surfaces of the plastic container substrate. However, in order to shut gases contained in air, the coating layer may be formed on the outer surface alone, and in order to prevent escape of a gas or perfume from the content of the bottle, the coating layer may be formed on the inner surface alone.

As pointed out hereinbefore, the vinylidene chloride copolymer that is used in the present invention is excellent in the combination of the oxygen barrier property and water vapor barrier property and the humidity dependency of the oxygen barrier property is very low. Accordingly, when the copolymer is formed on the plastic container substrate in the form of a very thin layer, excellent barrier properties to various gases can be obtained. More specifically, satisfactory results can oridinarily be obtained if the copolymer is formed in a layer on the container having a thickness of 0.5 to 40μ, especially 1 to 30μ.

The conditions adopted for drying the coated copolymer layer are changed according to the thickness of the coating layer, but ordinarily, a sufficient drying effect can be attained when drying is carried out at a temperature of 40° to 150° C. for about 2 seconds to about 100 hours.

In the present invention, if the aqueous latex or organic solvent solution of the vinylidene chloride copolymer is coated on a parison, preform or sheet formed by hot molding while the parison, preform or sheet is still hot, drying of the coating is accomplished by utilizing heat possessed by the parison or the like simultaneously with cooling of the parison or the like. Accordingly, this method is advantageous.

Draw molding of the parison, preform or sheet coated with the vinylidene chloride copolymer can be carried out under known conditions. More specifically, biaxial draw blow molding or draw forming such as air pressure forming or plug assist forming is carried out under such conditions as causing molecular orientation by drawing.

In case of biaxial draw blow molding, the parison or preform is mechanically drawn in the axial direction in a split mold, and simultaneously, a fluid is blown into the parison or preform to expand and draw the parison or preform in the circumferential direction. In case of a bottomed parison or preform, drawing in the axial direction may be accomplished by pushing a drawing rod into the bottomed parison or preform, and in case of a tube, drawing in the axial direction may be accomplished by holding both the ends of the tube by a clamping mechanism or passing the tube between two rolls differing in the rotation speed. It is preferred that draw blow molding be carried out so that the in-plane orientation coefficient (l+m) of the barrel portion of the formed container is 0.05 to 1.0, especially 0.1 to 0.9. For this purpose, it is preferred that the draw ratio in the axial direction be 1.10 to 20, especially 1.20 to 15, and that the draw ratio in the circumferential direction be 1.20 to 50, especially 1.25 to 30.

In draw forming of a wide-mouth container, the draw forming operation is carried out under temperature conditions causing molecular orientation by air pressure forming or plug assist forming so that the draw ratio defined by the following formula is 1.10 to 100, especially 1.20 to 50:

$$\text{Draw ratio} = \frac{\text{thickness of sheet}}{\text{thickness of barrel}}$$

According to the present invention, the coating layer on the plastic substrate is maintained at the crystallization temperature of the vinylidene chloride copolymer at the coating layer-forming step or draw molding step, whereby crystallization of the copolymer is accomplished. When it is intended to effect crystallization at the coating-forming step, the above-mentioned heat treatment is carried out simultaneously with or subsequently to the drying of the coating layer. In this case, it is necessary that the coating layer should be maintained at the crystallization temperature in the substantial absence of water or an organic solvent, because formation of a film of the vinylidene chloride copolymer is not substantially advanced in the presence of water or an organic solvent.

When it is intended to effect crystallization of the coating layer at the draw molding step, the heat treatment of heating the coated parison or preform at the drawing temperature and the temperature and time for the draw molding operation can be utilized for crystallization of the coating layer. This crystallization treatment is especially effective when the draw molding temperature of the plastic substrate is relatively high.

The degree of crystallization of the vinylidene chloride copolymer depends on both the temperature and time of the crystallization treatment. Furthermore, there is a fear of thermal deterioration of the vinylidene chloride copolymer due to the heat treatment for crystallization.

In the present invention, the heat treatment of the coating layer is carried out so that the following requirements are satisfied:

$$423° K. \geq T \geq 313° K, \text{ and}$$

$$500 \geq \lim_{\log a \to 0} \int_a^t \frac{(T - 313)}{k} d\log t \geq 10 \quad (1)$$

especially, $$300 \geq \lim_{\log a \to 0} \int_a^t \frac{(T - 313)}{k} d\log t \geq 30 \quad (2)$$

wherein T stands for the temperature (°K.) for the heat treatment of the coating layer, t stands for the time (seconds) of the heat treatment conducted at T°K., and k is a constant determined according to the kind of the vinylidene chloride copolymer, which is ordinarily in the range of $5 \leq k \leq 0.5$.

If the temperature-time integration value is too small and is below the above range, the crystallization is not sufficient and it is difficult to increase the adhesion to a satisfactory level. If this value is too large and exceeds the above range, the coating layer of the vinylidene chloride copolymer is thermally deteriorated and physical properties are rather degraded.

In the present invention, it is preferred that after the heat treatment, the coating layer be rapidly cooled so that the time-temperature integration value of the heat treatment conditions is not outside the above-mentioned range. In the case where the final heat treatment is draw molding, it is preferred that the plastic container formed by draw molding be rapidly cooled.

In order to protect the above-mentioned coating layer and improve the weatherability, scratch resistance and gas barrier property thereof, a protecting layer composed of a film-forming synthetic resin, other than the vinylidene chloride copolymer, may be formed adjacent to the coating layer according to the known and procedures.

The present invention will now be described in detail with reference to the following examples that by no means limit the scope of the invention.

In the examples, the crystallization degree, freeze peeling degree, low temperature adhesion strength (falling strength), scratch resistance (pencil hardness), chemical resistance, hot water resistance (boiling test) and oxygen permeation rate of each coating layer were determined according to the following methods.

(1) Crystallization Degree

The crystallization degree was determined according to the method disclosed on page 679 of "Emulsion Latex Handbook" (compiled by Editional Conference of Emulsion Latex Handbook and published by Daisensha). More specifically, the side wall portion was cut out from a coated container and the absorption spectrum of the coated surface was determined according to the total reflection method, transmission method or differential spectrum method using an infrared spectrophotometer (Model A-3 supplied by Nippon Bunko Kogyo). Among absorption bands characteristic of vinylidene chloride, which appear at 743, 875, 1046 and 1071 cm$^{-1}$, the absorption bands at 1046 and 1071 cm$^{-1}$ are considered to indicate the degree of crystallization. Accordingly, the ratio of the absorbances at 1046 and 1071 cm$^{-1}$ was designated as the crystallization degree. From the results of the X-ray diffractometry, it is proved that increase of the above-mentioned absorbance ratio means advance of crystallization in the internal structure of polyvinylidene chloride. Examples of the results of the measurement of the absorption spectrum and absorbances are shown in FIG. 2. Incidentally, FIG. 2 shows the results obtained with respect to a sample formed by coating a vinylidene chloride latex on a polyethylene film. The absorption bands at 720, 1350, 1425 and 2900 cm$^{-1}$ are those characteristic of polyethylene.

(2) Freeze Peeling Degree

A coated container, the weight of which had been measured in advance, was filled with distilled water, and water was frozen and expanded at $-15°$ C. The coating which was observed to have been peeled was removed from the container, and the weight of the empty container was then measured. The peeling degree (%) was calculated by dividing the difference between the weight of said container and the weight of the container before the freezing by the total amount of the coating according to the following formula:

$$\text{Peeling degree (\%)} = \frac{[(\text{weight before freezing}) - (\text{weight after freezing})]}{\text{total amount of coating}} \times 100$$

(3) Low Temperature Adhesion Strength (falling strength)

A coated container was filled with an aqueous solution of sodium chloride (the sodium chloride concentration was 10% by weight) maintained at $-1°$ C., and the container was plugged and was let to fall down on the concrete surface from a height of 1.5 m so that the side face of the container impinged against the concrete surface. For each coating condition, five sample containers were tested. Then, in order to determine whether or not micro-cracks were formed, the side wall portion of the container subjected to the falling test was cut out and was dyed at 50° C. for 5 minutes in a dyeing aqueous solution of Malachite Green, and the side wall portion was observed by a microscope (100 magnifications).

The falling strength was evaluated according to the following scale:
O: no cracks were formed in any of the five samples.
Δ: cracks were formed in 1 to 4 samples.
X: cracks were formed in all of the five samples.

(4) Scratch Resistance (pencil hardness)

Under conditions of a temperature of 20° C. and a relative humidity of 40%, a weight of 0.5 Kg was placed on each of pencils having a hardness in the range of from 6B to 6H, and lines having a length of about 2 cm were drawn on the coated surface of a barrel portion cut out from a sample container. Then, pencil dusts left on the surfaces were swept away, and the surface of the sample container was examined by a magnifying glass of 10 magnifications and the scratch resistance was evaluated based on the hardness of the pencil which left a scratch on the surface. Accordingly, the pencil hardness 6B indicates the lowest scratch resistance, and the scratch resistance is increased in the order of 5B, 4B, 3B, 2B, B, HB, F, H, 2H, 3H, 4H and 5H and the pencil hardness 6H indicates the highest scratch resistance.

(5) Hot Water Resistance

A square sample of about 3 cm × about 3 cm was cut out from the barrel wall of the coated container and was boiled on a thermostat hot water tank maintained at 95° C. for 30 minutes. Then, the sample was taken out from the tank and the whitening state was visually examined by a panel of five experts. Symbols shown in the following examples have the following meanings:

O: five or four experts on the panel judged that whitening did not occur.
Δ: two or three of the fine experts judged that whitening did not occur.
X: one or none of the fine experts judged that whitening did not occur.

(6) Chemical Resistance

The side wall portion of the coated container was cut out and immersed in an aqueous solution containing 10% by weight of caustic soda at 25° C. overnight. Before this immersion treatment, the total transmission of rays having a visible range wavelength of 400 mμ was measured with respect to the sample by using an integrating ball in a self-recording spectrophotometer (supplied by Hitachi), and the total transmission was similarly measured after the treatment with the aqueous solution of caustic soda. The chemical resistance was evaluated based on the deterioration degree expressed by the ratio Tafter/Tbefore, in which Tbefore represents the total transmission of the sample before the caustic soda treatment and Tafter represents the total transmission of the sample after the caustic soda treatment. A smaller value of the deterioration degree means a larger deterioration.

(7) Gas Barrier Property

As the gas barrier property, the oxygen permeation rate ($QO_2$) at a temperature of 20° C. and a relative humidity of 0% was measured according to the following procedures.

A barrel wall of a container to be measured was cut into a predetermined size and an obtained sheet-like sample was used for the measurement. A gas permeation tester manufactured by Toyo Tester Kogyo K.K. was used for the measurement. The sample was fixed between two chambers of this tester, and suction was effectd in one chamber so that the pressure was reduced below $10^{-2}$ mmHg (low pressure side) while in the other chamber (high pressure side), the atmosphere was replaced by dehumidified oxygen gas so that the oxygen gas pressure was one atmosphere. The change of the pressure increase with the lapse of time was read on a recorder and the oxygen gas permeation rate $QO_2$ was determined from the read values.

The measurement was carried out at 20° C. and the moisture was removed from the high pressure side chamber so that the relative humidity was 0%.

EXAMPLE 1

An anchoring agent (EL-220/EL-200-Ad supplied by Toyo Morton K.K.) was spray-coated on one surface of an isotactic polypropylene sheet having a width of 30 cm and a thickness of 0.8 mm the coating was heated for drying at 80° C. for 90 seconds. Then, a polyvinylidene chloride latex having a composition comprising 86% by weight of vinylidene chloride, 5% by weight of acrylonitrile, 3% by weight of methyl acrylate and 6% by weight of glycidyl methacrylate (dispersion medium = water, solid concentration = 51%) was spray-coated on the sheet. The average amount of the vinylidene chloride resin coated on the surface of the sheet (average thickness) was 10μ. Then, the sheet was subjected to plug assist vacuum forming at 135° C. so that the coated surface was formed into the inner surface, to obtain a square wide-mouth bottle (cup) "A" having a length of 9.7 cm, a width of 9.7 cm, a height of 3.2 cm and an average thickness of 0.47 mm. The heating time was 30 seconds. The inner surface of a square wide-mouth bottle of isotactic polypropylene formed from an uncoated sheet under the same forming conditions as described above was coated with the above-mentioned anchoring agent and then spray-coated with the above-mentioned polyvinylidene chloride latex, and the coated bottle was dried at 80° C. for 2 minutes. The average amount coated of the vinylidene chloride resin (average thickness) was 8μ. The obtained bottle is designated as "bottle B".

The crystallization degree, freeze peeling degree, low temperature adhesion strength (falling strength), scratch resistance (pencil hardness), hot water resistance, chemical resistance and oxygen permeation rate of each of the bottles A and B were measured according to the above-mentioned methods. The obtained results are shown in Table 1.

TABLE 1

| Bottle | A | B |
| --- | --- | --- |
| Crystallization Degree | 1.02 | 0.47 |
| Freeze Peeling Degree (%) | 0 | 8 |
| Falling Strength | O | X |
| Pencil Hardness | 4H | 2H |
| Hot Water Resistance | O | X |
| Chemical Resistance | 0.90 | 0.37 |
| $QO_2$ (cc/m$^2$ · day · atm) | 18 | 34 |

From the results shown in Table 1, it will readily be understood that by the heat treatment at the molding step, the degree of crystallization of the vinylidene chloride resin is increased, resulting in improvements of the freeze peeling strength, low temperature adhesion strength (falling strength), scratch resistance (pencil hardness), hot water resistance, chemical resistance and gas barrier property.

EXAMPLE 2

The non-heat-treated, vinylidene chloride resin-coated bottle B described in Example 1 was heat-treated under the heating conditions for the plug assist vacuum forming, described in Example 1. The obtained bottle is designated at "bottle C".

The crystallization degree, freeze peeling degree, low temperature adhesion strength (falling strength), scratch resistance (pencil hardness), hot water resistance, chemical resistance and oxygen permeation rate of the bottle C were determined according to the above-mentioned methods. The obtained results are shown in Table 2.

TABLE 2

| Bottle | C |
| --- | --- |
| Crystallization Degree | 0.95 |
| Freeze Peeling Degree (%) | 0 |
| Falling Strength | O |
| Pencil Hardness | 4H |
| Hot Water Resistance | O |
| Chemical Resistance | 0.87 |
| $QO_2$ (cc/m$^2$ · day · atm) | 22 |

When the results shown in Table 2 are compared with the results shown in table 1, it will readily be understood that when the bottle B is heat-treated under the above-mentioned conditions, the degree of crystallization of the coating layer of the bottle is increased, resulting in improvements of the freeze peel strength, falling strength, pencil hardness, not water resistance, chemical resistance and oxygen barrier property.

EXAMPLE 3

The inner surface of a preform (bottomed parison) of amorphous polyethylene terephthalate having an outer surface area of 130 cm$^2$, a weight of 63 g and an average thickness of 3.6 mm was dip-coated (slush-coated) with a polyvinylidene chloride resin emulsion having a composition comprising 90% by weight of vinylidene chloride and 10% by weight of acrylonitrile (dispersion medium = water, solid concentration = 45%), and the coated preform was dried by blowing hot air maintained at 100° C. for 1 minute. The amount coated of the vinylidene chloride resin was 0.23 g. The preform was heated at 120° C. for 25 seconds and biaxially draw-blow-molded by using a known biaxial draw blow molding machine to obtain a biaxially drawn polyethylene terephthalate bottle D having an inner volume of 2000 cc and an average total thickness of about 0.50 mm, the inner surface of which was coated with the polyvinylidene chloride resin (the average thickness of the coating layer was 1.5μ).

The uncoated preform was biaxially draw-blow-molded under the above-mentioned conditions and the resulting biaxially drawn polyethylene terephthalate bottle was dip-coated (slush-coated) with the above-mentioned vinylidene chloride resin emulsion. The coated bottle was dried by blowing hot air maintained at 100° C. for 2 minutes. The average coated amount (average thickness) of the vinylidene chloride resin was 3μ. This bottle is designated as "bottle E". The bottle E was heat-treated in an air-circulating oven under the above-mentioned conditions adopted for the biaxial draw blow molding machine. The heat-treated bottle is designated as "bottle F".

The crystallization degree, freeze peeling degree, low temperature adhesion strength (falling strength), scratch resistance (pencil hardness), hot water resistance, chemical resistance and oxygen permeation rate of each of the bottles D, E, and F were determined according to the above-mentioned methods. The obtained results are shown in Table 3.

TABLE 3

| Bottle | D | E | F |
| --- | --- | --- | --- |
| Crystallization Degree | 1.38 | 0.70 | 1.22 |
| Freeze Peeling Degree (%) | 0 | 32 | 0 |
| Falling Strength | O | X | O |
| Pencil Hardness | 4H | 2H | 4H |
| Hot Water Resistance | O | X | O |
| Chemical Resistance | 0.93 | 0.61 | 0.91 |
| $QO_2$ (cc/m$^2$ · day · atm) | 6.3 | 6.8 | 6.4 |

From the results shown in Table 3, it will readily be understood that the heat treatment effect can also be attained by the heating at the biaxial draw-blow-molding step. It will also be seen that the degree of crystallization in the bottle D is higher than in the bottle E and therefore, the bottle D is excellent over the bottle E in the chemical resistance and gas barrier property. It is considered that the reason is that also the vinylidene chloride resin is oriented by biaxial draw blow molding.

EXAMPLE 4

The outer surface of an amorphous polyethylene terephthalate preform as described in Example 3 was spray-coated with a vinylidene chloride copolymer solution having a composition comprising 90% by weight of vinylidene chloride, 5% by weight of acrylonitrile and 5% by weight of glycidyl acrylate (solvent=65% of tetrahydrofuran and 35% of toluene; solid concentration=20%) in the state where the preform was still hot (the surface temperature was 80° C.) just after injection molding. Then, the coated preform was heated at 100° C. for 2 minutes and biaxially draw-blow-molded by using a known biaxial draw blow molding machine to obtain a biaxially drawn polyethylene terephthalate bottle "G" having an inner volume of 2000 cc and an average total thickness of about 0.50 mm, the outer surface of which was coated with the polyvinylidene chloride resin (the average thickness of the coating layer was 2.0μ).

When the above-mentioned preform prepared by injection molding was cooled to room temerature, the preform was spray-coated with the above-mentioned vinylidene chlorde copolymer solution, and the coated preform was dried at 80° C. for 90 seconds in an air circulating oven and was then biaxially draw-blow-molded under the same conditions as described above to obtain a biaxially drawn polyethylene terephthalate bottle "H" having a coating layer thickness of 1.8μ.

The crystallization degree, freeze peeling degree, low temperature adhesion strength (falling strength), scratch resistane (pencil hardness), hot water resistance, chemical strength and oxygen permeation rate of each of the bottles G and H were determined according to the above-mentioned methods. The obtained results are shown in Table 4.

TABLE 4

| Bottle | G | H |
| --- | --- | --- |
| Crystallization Degree | 1.32 | 1.10 |
| Freeze Peeling Degree (%) | 0 | 10 |
| Falling Strength | O | Δ |
| Pencil Hardness | 4H | 2H |
| Hot Water Resistance | O | X |
| Chemical Resistance | 0.93 | 0.76 |
| $QO_2$ (cc/m$^2$ · day · atm) | 6.1 | 7.3 |

From the results shown in Table 4, it is seen that the degree of crystallization of the bottle G is higher than that of the bottle H and the bottle G is excellent over the bottle H in the freeze peel stength, falling strength, pencil hardness, hot water resistance and gas barrier property. It is considered that the reason is that since the preform which has not been cooled is coated, the heat treatment effect is attained at the step of heating the coating layer.

EXAMPLE 5

A pipe having a three-layer structure comprising an outer layer of isotactic polypropylene, an intermediate layer of an adhesive (maleic anhydride-modified polypropylene) and an inner layer of an ethylene/vinyl alcohol copolymer, in which the outer layer/intermediate layer/inner layer thickness ratio was 20:0.1:1, was formed by extrusion molding, and just after extrusion molding, the inner surface of the pipe was dip-coated with a polyvinylidene chloride latex having a composition comprising 90% by weight of vinylidene chloride, 5% by weight of methyl methacrylate and 5% by weight of methyl methacrylate (dispersion medium=water, solid concentration=50%). Also the cooling effect was attained by this coating operation. By using a known biaxial draw molding machine, the coated pipe was heated at 150° C. for 5 minutes and biaxially draw-blow-molded to obtain a biaxially drawn laminated bottle "I" having an inner volume of 500 cc and an average thickness of 500μ, the inner surface of which was coated with the polyvinylidene chloride resin (the average thickness of the coating layer was 3μ).

An uncoated three-layer pipe having the above-mentioned layer structure was biaxially draw-blow-molded in the same manner as described above, and the inner surface of the uncoated, biaxially drawn, laminated bottle was dip-coated (slush-coated) with the above-mentioned vinylidene chloride resin latex and the coated bottle was dried by blowing hot air maintained at 110° C. into the bottle for 90 seconds. The so-obtained, biaxially drawn, laminated bottle having the inner surface coated with the vinylidene chloride resin (the average thickness of the coating layer was 4μ) is designated as "bottle J".

The crystallization degree, freeze peeling degree, low temperature adhesion (falling strength), scratch resistance (pencil hardness), chemical resistance and oxygen permeation rate of each of the bottles I and J were determined according to the above-mentioned methods. The obtained results are shown in Table 5.

TABLE 5

| Bottle | I | J |
| --- | --- | --- |
| Crystallization Degree | 1.41 | 0.83 |
| Freeze Peeling Degree (%) | 0 | 30 |
| Falling Strength | O | X |
| Pencil Hardness | 4H | 2H |
| Hot Water Resistance | O | X |
| Chemical Resistance | 0.89 | 0.62 |
| $QO_2$ (cc/m$^2$ · day · atm) | 0.63 | 0.96 |

From the results shown in Table 5, it will readily be understood that by the heat treatment effect attained at the molding step, the degree of crystallization of the vinylidene chloride resin is increased, resulting in improvements of the freeze peel strength, low temperature adhesion strength, scratch resistance, chemical resistance and gas barrier property.

EXAMPLE 6

The outer surface of a preform (bottomed parison) of amorphous polyethylene terephthalate as described in Example 3 was dip-coated with the same vinylidene chloride resin emulsion as used in Example 3. Just after the coating operation, in the state where the preform was not yet dried, in a heating zone of a known biaxial draw blow molding machine, the preform was heated at 115° C. for 30 seconds and was then biaxially draw-blow-molded to obtain a biaxially drawn polyethylene terephthalate bottle "K" having the outer surface coated with the same vinylidene chloride resin as used in Example 3 (the average thickness of the coating layer was 1.6μ).

The outer surface of the above-mentioned preform was dip-coated with the above-mentioned vinylidene chloride resin emulsion, and the coated preform was dried at 80° C. for 90 seconds in a perfect oven (explosion-proof type). Then, the coated preform was heated under the above-mentioned heating conditions and was biaxially draw-blow-molded to obtain a biaxially drawn polyethylene terephthalate bottle "L" having the outer surface coated with the above-mentioned vinylidene chloride resin (the average thickness of the coating layer was 1.5μ).

The crystallization degree, freeze peeling degree, low temperature adhesion strength (falling strength), scratch resistance (pencil hardness), hot water resistance, chemical resistance and gas barrier property (oxygen permeation rate) of each of the bottles K and L were determined according to the above-mentioned methods. The obtained results are shown in Table 6.

TABLE 6

| Bottle | K | L |
| --- | --- | --- |
| Crystallization Degree | 1.36 | 1.37 |
| Freeze Peeling Degree (%) | 0 | 0 |
| Falling Strength | O | O |
| Pencil Hardness | 4H | 4H |
| Hot Water Resistance | O | O |
| Chemical Resistance | 0.92 | 0.92 |
| $QO_2$ (cc/m$^2$ · day · atm) | 6.5 | 6.4 |

From the results shown in Table 6, it is seen that even when the drying of the coated vinylidene chloride resin emulsion and the heat treatment are subsequently carried out at the heating step of the biaxial draw blow molding process, the degree of crystallization comparable to the degree of crystallization obtainable when the drying of the coated vinylidene chloride resin emulsion is carried out in advance and the heat treatment is independently effected at the heating step can be obtained, and therefore, the freeze peel strength, low temperature adhesion strength (falling strength), scratch resistance (pencil hardness), hot water resistance, chemical resistance and gas barrier property (oxygen permeation rate) can similarly be improved.

EXAMPLE 7

Just after an amorphous polyethylene terephthalate sheet having a thickness of 0.5 mm was prepared by extrusion, the sheet was dip-coated with the same vinylidene chloride resin latex as described in Example 1. Also the cooling effect was attained by the coating operation. The coated sheet was dried. Then, the sheet was heated at 110° C for 15 minutes and subjected to air pressure forming to obtain a square wide-mouth bottle (cup) "M" having a length of 9.7 cm, a width of 9.7 cm, a height of 3.2 cm and an average thickness of 0.30 mm, the inner and outer surfaces of which were coated with the vinylidene chloride resin. The average coated amount (average thickness) of the vinylidene chloride resin coated on both the surfaces of the bottle was 25μ (the total amount on both the surfaces).

Separately, the above-mentioned polyethylene terephthalate sheet was first cooled to room temperature and was then dip-coated with the above-mentioned vinylidene chloride resin latex. The coated sheet was dried at 70° C. for 2 minutes in an air-circulating oven and subjected to air pressure forming under the same heating and molding conditions as described above to obtain a similar square wide-mouth bottle (cup) "N" in which the average coated amount was 20μ (the total amount on both the surfaces).

An uncoated bottle obtained under the same molding conditions as described above was dip-coated with the above-mentioned vinylidene chloride resin latex and was dried at 70° C. for 2 minutes in an air-circulating oven. The resulting bottle which had not been heat-treated is designated as "bottle O". The average coated amount was 20μ (the total amount on both the surfaces).

The crystallization degree, freeze peeling degree, low temperature adhesion strength (falling strength), scratch resistance (pencil hardness), hot water resistance, chemical resistance and oxygen permeation rate of each of the bottles M, N and O were determined according to the above-mentioned results. The obtained results are shown in Table 7.

TABLE 7

| Bottle | M | N | O |
| --- | --- | --- | --- |
| Crystallization Degree | 1.02 | 1.01 | 0.47 |
| Freeze Peeling Degree (%) | 0 | 0 | 10 |
| Falling Strength | O | O | X |
| Pencil Hardness | 4H | 4H | 2H |
| Hot Water Resistance | O | O | X |
| Chemical Resistance | 0.91 | 0.90 | 0.40 |
| $QO_2$ (cc/m$^2$ · day · atm) | 2.3 | 3.5 | 3.9 |

From the results shown in Table 7, it is seen that by the heat treatment effect attained at the heating step of the air pressure forming process, the degree of crystallization of the vinylidene chloride resin is increased, resulting in improvements of the freeze peel strength, low temperature adhesion, scratch resistance, hot water resistance and chemical resistance.

COMPARATIVE EXAMPLE 1

The crystallization degree (lowest film-forming temperature) of the vinylidene chloride resin latex described in Example 1 was increased (raised) in advance, and in the same manner as described in Example 1, the resin latex was coated on an anchoring agent-coated isotactic polypropylene sheet as described in Example 1 and the coated sheet was dried. The average coated amount (average thickness) of the vinylidene chloride resin coated on the surface of the sheet was 10μ as in Example 1. Under the same conditions as described in Example 1, the coated sheet was subjected to plug assist vacuum forming so that the coated surface was formed into the inner surface to obtain a square wide-mouth bottle "A'" similar to the bottle obtained in Example 1.

The crystallization degree, freeze peeling degree, low temperature adhesion strength (falling strength), scratch resistance (pencil hardness), hot water resistance, chemical resistance and gas barrier property (oxygen permeation rate) of the bottle A' were determined according to the above-mentioned methods. The obtained results are shown in Table 8.

TABLE 8

| Bottle | A' |
| --- | --- |
| Crystallization Degree | 1.04 |
| Freeze Peeling Degree (%) | 81 |
| Falling Strength | X |
| Pencil Hardness | B |
| Hot Water Resistance | X |
| $QO_2$ (cc/m$^2$ · day · atm) | 107 |

When the results shown in Table 8 are compared with the results of the bottle A shown in Table 1, it is seen that although the degree of crystallization of the bottle A' is higher than that of the bottle A, the bottle A' is apparently inferior to the bottle A in the freeze peel strength, low temperature adhesion strength, scratch resistance, hot water strength and gas barrier property. Accordingly, it will readily be understood that in order to improve the properties, it is necessary to increase the degree of crystallization of the vinylidene chloride by giving a heat history while a bottle is being formed.

COMPARATIVE EXAMPLE 2

When the isotactic polypropylene sheet coated with the vinylidene chloride resin latex was subjected to plug assist vacuum forming in Example 1, the heating conditions were changed to 150° C. and 2 minutes. The obtained square wide-mouth bottle (cup) similar to the bottle obtained in Example 1 is designated as "bottle P".

The crystallization degree, freeze peeling degree, low temperature adhesion strength (falling strength), scratch resistance (pencil hardness), hot water resistance, chemical resistance and oxygen permeation rate of the bottle P were determined according to the above-mentioned methods. The obtained results are shown in Table 9.

TABLE 9

| Bottle | P |
| --- | --- |
| Crystallization Degree | 0.86 |
| Freeze Peeling Degree (%) | 10 |
| Falling Strength | X |
| Pencil Hardness | H |
| Hot Water Resistance | X |
| Chemical Resistance | 0.53 |
| $QO_2$ (cc/m$^2$ · day · atm) | 28 |

When the results shown in Table 9 are compared with the results shown in Table 1, it is seen that if the heat treatment conditions are outside the range defined by the formula (2), the intended improvements cannot be attained.

What is claimed is:

1. In a process for the preparation of a coated oriented plastic container by the steps of coating an aqueous latex or organic solvent solution of a vinylidene chloride copolymer on at least one surface of a preform for formation of a container, wherein said preform is formed by hot molding of a molecularly orientable thermoplastic resin, drying the coated preform to form a coating layer, and subjecting the formed coated structure to draw molding to form said container, the improvement comprising heat-treating the coating layer of the vinylidene chloride copolymer at the step of forming the coating layer or the draw molding step until the degree of crystallization of the vinylidene chloride copolymer is increased to at least 0.8 as measured according to the infrared absorption spectrum method, whereby the coating layer resists peeling off of said container at the draw molding step and when said container and any contents therein are subjected to freezing temperature.

2. The process of claim 1 wherein the degree of crystallization of the vinyl chloride copolymer in the aqueous latex or organic solvent solution is less than 0.8 and is increased by the heat-treating step to at least 0.95.

3. A process according to claim 1, wherein the formed coating is heat-treated so that the following requirements are satisfied, thereby to effect crystallization:

$$423° K. \geq T \geq 313° K., \text{ and}$$

$$500 \geq \lim_{\log a \to 0} \int_a^t \frac{(T - 313)}{k} d \log t \geq 10$$

wherein T stands for the temperature (°K.) for the heat treatment of the coating layer, t stands for the time (seconds) of the heat treatment conducted at T°K., and k is a constant determined according to the kind of the vinylidene chloride copolymer, which is ordinarily in the range of $5 \geq k \geq 0.5$.

4. A process according to claim 1, wherein while the preform formed by hot molding is still hot, the aqueous latex or organic solvent solution of the vinylidene chloride copolymer is coated and drying of the coating layer is performed simultaneously with cooling of the preform.

5. A process according to claim 1 wherein the step of draw molding comprises biaxial draw blow molding.

6. A process according to claim 1 wherein the step of draw molding comprises draw forming.

7. A process according to claim 1 wherein the coating layer of the vinylidene chloride copolymer is heat-treated at the step of forming the coating layer to crystallize the copolymer.

8. A process according to claim 1 wherein the coating layer of the vinylidene chloride copolymer is heat-treated at the draw molding step to crystallize the copolymer.

9. The process of claim 1 wherein the coating is dried at a temperature of 40° to 150° C. for about 2 seconds to about 100 hours.

10. The process of claim 1 wherein said plastic container is formed from at least one thermoplastic resin selected from the group consisting of polyethylene, polypropylene, olefin copolymers, polyesters, polyamides, polystyrene, styrene copolymers, polyvinylchloride, vinyl chloride copolymers, polymethylmethacrylate, acrylic copolymers, polycarbonate and mixtures thereof.

11. The process of claim 1 wherein said vinylidene chloride copolymer is a copolymer comprising vinylidene chloride as the main constituent monomer and at least one comonomer selected from the group consisting of an acrylic monomer, a methacrylic monomer, a vinyl aromatic monomer, a vinyl ester, a diolefin, methylvinyl ether, glycidyl allyl ether, vinyl chloride, trichloroethylene, tetrachloroethylene, vinyl fluoride, vinylidene fluoride, trifluoroethylene, tetrafluoroethylene, maleic anhydride, fumaric acid, vinyl succinimide, vinylpyrrolidone and mixtures thereof.

12. The process of claim 1 wherein an aqueous latex of the vinylidene copolymer is used, said latex having a solid concentration of 20 to 65% and a viscosity of 3 to 500 centipoises.

13. The process of claim 1 wherein said organic solvent solution of the vinylidene chloride copolymer is used, said solution having a solid content of 5 to 60% in an organic solvent selected from the group consisting of toluene, tetrahydrofuran, ethyl acetate, methylethyl ketone, cyclohexane, dimethylformamide, dimethylsulfoxide and dioxane.

14. The process of claim 1 which comprises coating the aqueous latex or organic solvent solution of the vinylidene chloride copolymer on both surfaces of the plastic container.

15. The process of claim 1 wherein the thickness of the coating of the vinylidene chloride copolymer is from 0.5 to 40 microns.

16. A process for the preparation of a coated oriented plastic container, which comprises coating an aqueous latex or organic solvent solution of a vinylidene chloride copolymer on at least one surface of a sheet for formation of container, which is formed by hot molding of a molecularly orientable thermoplastic resin, drying the coated sheet to form a coating layer, and subjecting the formed coated structure to draw molding, and heat-treating the coating layer of the vinylidene chloride copolymer at the step of forming the coating layer or the draw molding step until the degree of crystallization is at least 0.5 as measured according to the infrared absorption spectrum method.

17. The process of claim 16 wherein the coating is dried at a temperature of 40° to 150° C. for about 2 seconds to about 100 hours.

18. A process according to claim 16, wherein the formed coating is heat-treated so that the following requirements are satisfied, thereby to effect crystallization:

423° K. $\geq T \geq$ 313 K., and $$500 \geq \lim_{\log a \to o} \int_a^t \frac{(T-313)}{k} \, d\log t \geq 10$$

wherein T stands for the temperature (°K.) for the heat treatment of the coating layer, t stands for the time (seconds) of the heat treatment conducted at T°K., and k is a constant determined according to the kind of the vinylidene chloride copolymer, which is ordinarily in the ange of $5 \geq k \geq 0.5$.

19. A process according to claim 16, wherein while the sheet formed by hot molding is still hot, the aqueous latex or organic solvent solution of the vinylidene chloride copolymer is coated and drying of the coating layer is performed simultaneously with cooling of the sheet.

20. A process according to claim 16 wherein the step of draw molding comprises biaxial draw blow molding.

21. A process according to claim 16 wherein the step of draw molding comprises draw forming.

22. A process according to claim 16 wherein the coating layer of the vinylidene chloride copolymer is heat-treated at the step of forming the coating layer to crystallize the copolymer.

23. A process according to claim 16 wherein the coating layer of the vinylidene chloride copolymer is heat-treated at the draw molding step to crystallize the copolymer.

24. The process of claim 16 wherein the degree of crystallization of the coating is at least 0.8 as measured according to the infrared absorption spectrum method.

25. In a process for the preparation of a coated oriented plastic container by the steps of coating an aqueous latex or organic solvent solution of a vinylidene chloride copolymer on at least one surface of a sheet for formation of a container, said sheet being formed by hot molding of a molecularly orientable thermoplastic resin, drying the coated sheet to form a coating layer, and subjecting the formed coated structure to draw molding to form said container, the improvement comprising heat-treating the coating layer of the vinylidene chloride copolymer at the step of forming the coating layer or the draw molding step until the degree of crystallization of the vinylidene chloride copolymer is increased to at least 0.8 as measured according to the infrared absorption spectrum method, whereby the coating layer resists peeling off of said container at the draw molding step and when said container and any contents therein are subjected to freezing temperatures.

26. The process of claim 25 wherein the degree of crystallization of the vinyl chloride copolymer in the aqueous latex or organic solvent solution is less than 0.8 and is increased by the heat-treating step to at least 0.95.

27. A process according to claim 25, wherein the formed coating is heat-treated so that the following requirements are satisfied, thereby to effect crystallization:

423° K. $\geq T \geq$ 313 K., and $$500 \geq \lim_{\log a \to o} \int_a^t \frac{(T-313)}{k} \, d\log t \geq 10$$

wherein T stands for the temperature (°K.) for the heat treatment of the coating layer, t stands for the time (seconds) of the heat treatment conducted at T°K., and k is a constant determined according to the kind of the vinylidene chloride copolymer, which is ordinarily in the range of $5 \geq k \geq 0.5$.

28. A process according to claim 25, wherein while the sheet formed by hot molding is still hot, the aqueous latex or organic solvent solution of the vinylidene chloride copolymer is coated and drying of the coating layer is performed simultaneously with cooling of the sheet.

29. A process according to claim 25 wherein the step of draw molding comprises biaxial draw blow molding.

30. A process according to claim 25 wherein the step of draw molding comprises draw forming.

31. A process according to claim 25 wherein the coating layer of the vinylidene chloride copolymer is heat-treated at the step of forming the coating layer to crystallize the copolymer.

32. A process according to claim 25 wherein the coating layer of the vinylidene chloride copolymer is heat-treated at the draw molding step to crystallize the copolymer.

33. The process of claim 25 wherein the thickness of the coating of the vinylidene chloride copolymer is from 0.5 to 40 microns.

34. The process of claim 25 wherein the coating is dried at a temperature of 40° to 150° C. for about 2 seconds to about 100 hours.

35. The process of claim 25 wherein said plastic container is formed from at least one thermoplastic resin selected from the group consisting of polyethylene, polypropylene, olefin copolymers, polyesters, polyamides, polystyrene, styrene copolymers, polyvinyl chloride, vinyl chloride copolymers, polymethylmethacrylate, acrylic copolymers, polycarbonate and mixtures thereof.

36. The process of claim 25 wherein said vinylidene chloride copolymer is a copolymer comprising vinylidene chloride as the main constituent monomer and at least one comonomer selected from the group consisting of an acrylic monomer, methacrylic monomer, a vinyl aromatic monomer, a vinyl ester, a diolefin, methyl vinyl ether, glycidyl allyl ether, vinyl chloride, trichloroethylene, tetrachloroethylene, vinyl fluoride, vinylidene fluoride, trifluoroethylene, tetrafluoroethylene, maleic anhydride, fumaric acid, vinyl succinimide, vinyl pyrrolidone and mixtures thereof.

37. The process of claim 25 wherein an aqueous latex of the vinylidene copolymer is used, said latex having a solid concentration of 20 to 26% and a viscosity of 3 to 500 centipoises.

38. The process of claim 25 wherein said organic solvent solution of the vinylidene chloride copolymer is used, said solution having a solid content of 5 to 60% in an organic solvent selected from the group consisting of toluene, tetrahydrofuran, ethyl acetate, methylethyl ketone, cyclohexane, dimethylformamide, dimethylsulfoxide and dioxane.

39. The process of claim 25 which comprises coating the aqueous latex organic solvent solution of the vinylidene chloride copolymer on both surfaces of the plastic container.

* * * * *